(12) United States Patent
Choi et al.

(10) Patent No.: US 10,270,088 B2
(45) Date of Patent: Apr. 23, 2019

(54) POSITIVE ACTIVE MATERIAL COMPOSITION, AND LITHIUM SECONDARY BATTERY INCLUDING THE POSITIVE ELECTRODE INCLUDING THE POSITIVE ACTIVE MATERIAL COMPOSITION, AND LITHIUM BATTERY INCLUDING THE POSITIVE ELECTRODE

(71) Applicant: SAMSUNG SDI CO., LTD., Yongin-si, Gyeonggi-do (KR)

(72) Inventors: Yeonjoo Choi, Yongin-si (KR); Junghyun Nam, Yongin-si (KR); Bokkyu Jeon, Yongin-si (KR); Hoon Seok, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 100 days.

(21) Appl. No.: 15/451,984

(22) Filed: Mar. 7, 2017

(65) Prior Publication Data
US 2017/0263921 A1    Sep. 14, 2017

(30) Foreign Application Priority Data

Mar. 10, 2016 (KR) .......................... 10-2016-0029090

(51) Int. Cl.
*H01M 4/36* (2006.01)
*H01M 10/05* (2010.01)
(Continued)

(52) U.S. Cl.
CPC .......... *H01M 4/364* (2013.01); *H01M 4/505* (2013.01); *H01M 4/525* (2013.01); *H01M 4/5825* (2013.01); *H01M 4/622* (2013.01); *H01M 4/625* (2013.01); *H01M 10/052* (2013.01); *H01M 10/0565* (2013.01); *H01M 2004/028* (2013.01); *H01M 2300/0082* (2013.01)

(58) Field of Classification Search
None
See application file for complete search history.

(56) References Cited

U.S. PATENT DOCUMENTS

| 4,696,764 A | 9/1987 | Yamazaki |
| 2011/0059372 A1* | 3/2011 | Chiga .................. H01M 4/131 429/346 |

(Continued)

FOREIGN PATENT DOCUMENTS

KR    10-2011-0045024 A    5/2011

OTHER PUBLICATIONS

Cheon, et al. "Effect of Binary Conductive Agents in LiCoO$_2$ Cathode on Performances of Lithium Ion Polymer Battery" Electrochimica Acta, vol. 46, Issue 4, Abstract.

*Primary Examiner* — Scott J. Chmielecki
(74) *Attorney, Agent, or Firm* — Lee & Morse, P.C.

(57) ABSTRACT

A positive active material composition for a lithium secondary battery includes a positive active material that allows intercalation and deintercalation of lithium ions, a binder, and a conductive agent. The conductive agent includes a first conductive agent having an average particle diameter (D50) ranging from about 20 nanometers (nm) to about 40 nm and a second conductive agent having a D50 ranging from about 1 micrometer (μm) to about 5 μm.

17 Claims, 2 Drawing Sheets

(51) Int. Cl.
- *H01M 4/505* (2010.01)
- *H01M 4/525* (2010.01)
- *H01M 4/58* (2010.01)
- *H01M 4/62* (2006.01)
- *H01M 10/052* (2010.01)
- *H01M 10/0565* (2010.01)
- H01M 4/02 (2006.01)

(56) References Cited

U.S. PATENT DOCUMENTS

| | | | |
|---|---|---|---|
| 2011/0157773 A1 | 6/2011 | Sasaki | |
| 2011/0318646 A1* | 12/2011 | Babinec | C08G 65/2654 |
| | | | 429/309 |
| 2012/0225199 A1* | 9/2012 | Muthu | H01M 4/131 |
| | | | 427/126.4 |
| 2013/0171527 A1 | 7/2013 | Lanning et al. | |
| 2016/0226094 A1* | 8/2016 | Yamazaki | H01M 10/0562 |
| 2016/0285099 A1* | 9/2016 | Schulz | H01G 11/08 |
| 2016/0351967 A1* | 12/2016 | Kako | H01M 4/625 |
| 2017/0069909 A1* | 3/2017 | Eom | H01M 4/366 |
| 2017/0155167 A1* | 6/2017 | Abe | H01M 2/1686 |
| 2017/0309948 A1* | 10/2017 | Azami | H01M 4/13 |
| 2017/0352913 A1* | 12/2017 | Lecuyer | H01M 2/1653 |
| 2017/0365858 A1* | 12/2017 | Yun | H01M 4/625 |
| 2017/0373314 A1* | 12/2017 | Takeda | H01M 4/587 |
| 2018/0076451 A1* | 3/2018 | Kim | H01M 4/366 |
| 2018/0090766 A1* | 3/2018 | Ohsawa | H01M 4/13 |

\* cited by examiner

POSITIVE ACTIVE MATERIAL COMPOSITION, AND LITHIUM SECONDARY BATTERY INCLUDING THE POSITIVE ELECTRODE INCLUDING THE POSITIVE ACTIVE MATERIAL COMPOSITION, AND LITHIUM BATTERY INCLUDING THE POSITIVE ELECTRODE

CROSS-REFERENCE TO RELATED APPLICATION

Korean Patent Application No. 10-2016-0029090, filed on Mar. 10, 2016, in the Korean Intellectual Property Office, and entitled: "Positive Active Material Composition for Lithium Secondary Battery, Positive Electrode Including the Positive Active Material Composition, and Lithium Secondary Battery Including the Positive Electrode," is incorporated by reference herein in its entirety.

BACKGROUND

1. Field

Embodiments relate to a positive active material composition for a lithium secondary battery, a positive electrode including the positive active material composition, and a lithium secondary battery including the positive electrode.

2. Description of the Related Art

Lithium secondary batteries are widely used in portable electronic devices, hybrid vehicles (HVs), plug-in hybrid vehicles (PHVs), electric vehicles (EVs), and smart grid technology.

Recently, all-solid lithium secondary batteries that include a solid electrolyte as a lithium ion conductor have drawn attention as batteries with high stability. In all-solid lithium secondary batteries, a positive active material composition for a positive electrode may include a conductive agent.

SUMMARY

Embodiments are directed to a positive active material composition for a lithium secondary battery including a positive active material, a binder, and a conductive agent. The conductive agent includes a first conductive agent having an average particle diameter (D50) ranging from about 20 nanometers (nm) to about 40 nm and a second conductive agent having a D50 ranging from about 1 micrometer (μm) to about 5 μm.

The first conductive agent and the second conductive agent may include a carbon material.

The carbon material may include at least one selected from carbon black, graphite powder, natural graphite, artificial graphite, and acetylene black.

The first conductive agent may include carbon black, and the second conductive agent may include graphite powder.

The first conductive agent may have a D50 ranging from about 30 nm to about 35 nm.

An amount of the conductive agent may be about 3 percent by weight (wt %) to about 15 wt %, based on the total weight of the positive active material composition.

The binder may be an ion conductive polymer binder.

The binder may include a binder represented by Formula 1:

$$\text{---}(\text{CH}_2)_{\overline{2}}\text{---}\overset{\overset{\displaystyle O}{\|}}{\text{C}}\text{---}\text{O}\text{---}_n \qquad \text{Formula 1}$$

wherein, in Formula 1, n is an integer selected from 500 to 50,000.

The binder may further include a lithium salt.

The lithium salt may include at least one selected from lithium bis(trifluoromethane)sulfonimide (LiTFSI), lithium bis(fluorosulfonyl) imide (LiFSI), LiClO$_4$, LiBF$_4$, and LiPF$_6$.

A molar ratio of repeating units to lithium ions in the binder may be in a range of about 8:1 to about 1:1.

An amount of the binder may be about 10 wt % to about 35 wt %, based on the total weight of the positive active material composition.

The positive active material may include at least one selected from positive active materials represented by Formulae 2 to 4:

$$\text{Li}_a(\text{Ni}_x\text{M}'_y)\text{O}_2, \qquad \text{Formula 2}$$

wherein, in Formula 2, M' is at least one element selected from cobalt (Co), manganese (Mn), iron (Fe), vanadium (V), copper (Cu), chromium (Cr), aluminum (Al), magnesium (Mg), and titanium (Ti), $0.9 < a \leq 1.1$, $0 \leq x < 0.6$, $0.4 \leq y \leq 1$, and $x+y=1$, $$\text{LiMPO}_4, \qquad \text{Formula 3}$$

wherein, in Formula 3, M is at least one element selected from Fe, Mn, nickel (Ni), Co, and V, $$\text{Li}_{1+y1}\text{Mn}_{2-y1-z1}\text{M}''_{z1}\text{O}_{4-x1}\text{Q}_{x1}, \qquad \text{Formula 4}$$

wherein, in Formula 4, M'' is at least one element selected from Mg, Al, Ni, Co, Fe, Cr, Cu, boron (B), calcium (Ca), niobium (Nb), molybdenum (Mo), strontium (Sr), antimony (Sb), tungsten (W), Ti, V, zirconium (Zr), and zinc (Zn), Q is at least one element selected from nitrogen (N), fluorine (F), sulfur (S), and chlorine (Cl), $0 \leq x1 \leq 1$, $0 \leq y1 \leq 0.34$, and $0 \leq z1 \leq 1$.

An amount of the positive active material may be about 65 wt % to about 85 wt %, based on the total weight of the positive active material composition.

Embodiments are also directed to a positive electrode for a lithium secondary battery including a current collector and a positive active material layer formed on the current collector. The positive active material layer includes the positive active material composition described above.

A packing density of the positive active material layer may be about 2.06 g/cm$^2$ or greater.

A porosity of the positive active material layer may be about 21 vol % or less, based on a total volume of the positive active material layer.

Embodiments are also directed to a lithium secondary battery including the positive electrode as described above, a negative electrode including a negative active material, and an electrolyte between the positive electrode and the negative electrode.

The electrolyte may be or include a solid electrolyte.

The solid electrolyte may include at least one selected from polyurethane doped with lithium, a polyethylene derivative, a polyethylene oxide derivative, a polypropylene oxide derivative, a phosphoric acid ester polymer, a poly agitation lysine, a polyester sulfide, a polyvinyl alcohol, a polyvinylidene difluoride, and a polymer including an ionic dissociable group.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
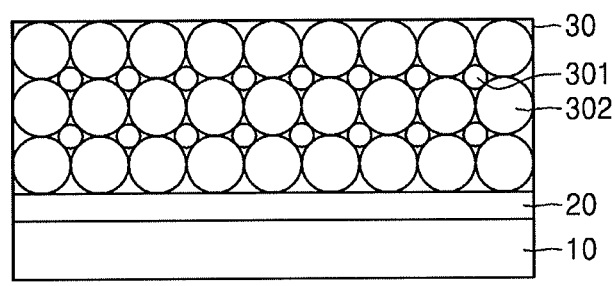
FIG. 1 illustrates a schematic view of an embodiment of a structure of a positive electrode for a lithium secondary battery.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present.

The term "average particle diameter (D50)" as used herein refers to a diameter corresponding to 50% in an accumulated particle size distribution curve, when the total number of particles is 100% in the accumulated particle size distribution curve in which particles are sequentially accumulated in the order of a particle having the smallest size to a particle having the largest size. The D50 may be measured by using one or more suitable methods available in the art such as, for example, a method using a particle size analyzer, transmission electron microscopy (TEM), or scanning electron microscopy (SEM). Alternatively, for example, after a measurement apparatus using dynamic light-scattering is used, data analysis may be performed to count the number of particles for each of the particle size ranges, which will provide the D50 values.

A positive active material composition for a lithium secondary battery, according to one or more embodiments, may include a positive active material that allows intercalation and deintercalation of lithium ions; a binder; and a conductive agent. The conductive agent may include a first conductive agent having a D50 ranging from about 20 nanometers (nm) to about 40 nm and a second conductive agent having a D50 ranging from about 1 micrometer (μm) to about 5 μm.

The positive active material composition for a lithium secondary battery may include a conductive agent in a bimodal form. The conductive agent in bimodal form may include a first conductive agent having a D50 ranging from about 20 nm to about 40 nm and a second conductive agent having a D50 ranging from about 1 μm to about 5 μm.

The first conductive agent and the second conductive agent may be a carbon material.

The carbon material may include at least one selected from carbon black, graphite powder, natural graphite, artificial graphite, and acetylene black.

For example, the first conductive agent may be carbon black and the second conductive agent may be graphite powder. The first conductive agent and the second conductive agent may effectively secure an electrical conductive pathway and a lithium ion diffusion pathway.

For example, the first conductive agent may have a D50 ranging from about 30 nm to about 35 nm. The first conductive agent may have a D50 ranging from about 30 nm to about 35 nm and the second conductive agent may have a D50 ranging from about 1 μm to about 5 μm, as examples. When the D50 of the first conductive agent and the second conductive agent are within any of these ranges, the first conductive agent may contribute to a more effective electrical contact and the second conductive agent may facilitate lithium ion diffusion. Accordingly, a positive electrode and a lithium secondary battery that include a positive active material layer including a positive active material composition including the first conductive agent and the second conductive agent may have improved current density and/or energy density.

The amount of the conductive agent may be about 3 percent by weight (3 wt %) to about 15 wt %, based on the total weight of the positive active material composition. A positive active material composition that includes the conductive agent within the above range may secure an amount of a positive active material that contributes to capacity, thus maintaining the capacity and lifespan characteristics of a positive electrode and a lithium secondary battery.

The mixture weight ratio of the first conductive agent to the second conductive agent may be properly adjusted depending on a desired battery performance. As an example, the mixture weight ratio of the first conductive agent to the second conductive agent may be about 1:1.

The binder may be an ion conductive polymer binder. The binder may solidly bind the positive active material layer and may facilitate lithium ion conduction from the positive active material layer to the solid electrolyte.

For example, the ion conductive polymer binder may include a polyalkylene oxide, such as polyethylene oxide or polypropylene oxide, a polyalkylene carbonate, such as polymethylene carbonate or polyethylene carbonate, a polyurethane, or a polyurethane doped with lithium.

For example, the binder may include a binder represented by Formula 1:

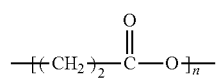

Formula 1 wherein, in Formula 1, n may be an integer selected from about 500 to about 50,000. In some embodiments, n may be an integer selected from about 500 to about 20,000. In some embodiments, n may be an integer selected from about 500 to about 10,000. In some embodiments, n may be an integer selected from about 500 to about 5,000. In some embodiments, n may be an integer selected from about 500 to about 2,000. It is to be understood that Formula 1 only represents internal repeating units and that the binder represented by Formula 1 may be terminated by a suitable terminal group.

The binder represented by Formula 1 may be an amorphous polymer. The binder may further include a lithium salt. When the binder includes a soluble lithium salt and polyethylene oxide, which is a semicrystalline polymer that improves ion conductivity the binder may have a greater molar ratio of a soluble lithium salt than polyethylene oxide.

The lithium salt may include at least one selected from lithium bis(trifluoromethane)sulfonimide (LiTFSI), lithium bis(fluorosulfonyl) imide (LiFSI), LiClO$_4$, LiBF$_4$, and LiPF$_6$. For example, the lithium salt may be lithium bis (trifluoromethylsulfonyl)imide (LiTFSI).

The molar ratio of repeating units to lithium ions in the binder may be in a range of about 8:1 to about 1:1. In some embodiments, the molar ratio of repeating units to lithium ions in the binder may be in a range of about 8:1 to about 2:1. When the molar ratio of repeating units to lithium ions in the binder is within these ranges, a positive electrode and a lithium secondary battery including the binder may have significantly improved ionic conductivity at room temperature (25° C.) and at a high temperature (45° C. or greater) and may have low cell bulk and charge migration resistance. Thus, the positive electrode and the lithium secondary battery may have improved charging and discharging characteristics even at a high rate.

The binder may be mixed with a positive active material layer and/or form a separate binder layer between a positive electrode current collector and the positive active material layer.

The amount of the binder may be about 10 wt % to about 35 wt %, based on the total weight of the positive active material composition. A positive active material composition that includes the binder within the above range may secure an amount of a positive active material that contributes to capacity, thus maintaining the capacity and lifespan characteristics of a positive electrode and a lithium secondary battery.

The positive active material may include at least one selected from positive active materials represented by Formulae 2 to 4:

$$Li_a(Ni_xM'_y)O_2. \quad \text{Formula 2}$$

wherein, in Formula 2, M' is at least one element selected from cobalt (Co), manganese (Mn), iron (Fe), vanadium (V), copper (Cu), chromium (Cr), aluminum (Al), magnesium (Mg), and titanium (Ti), $0.9 < a \leq 1.1$, $0 \leq x < 0.6$, $0.4 \leq y \leq 1$, and $x+y=1$, $$LiMPO_4. \quad \text{Formula 3}$$

wherein, in Formula 3, M is at least one element selected from Fe, Mn, nickel (Ni), Co, and V, $$Li_{1+y1}Mn_{2-y1-z1}M''_{z1}O_{4-x1}Q_{x1}, \quad \text{Formula 4}$$

wherein, in Formula 4, M'' is at least one element selected from Mg, Al, Ni, Co, Fe, Cr, Cu, boron (B), calcium (Ca), niobium (Nb), molybdenum (Mo), strontium (Sr), antimony (Sb), tungsten (W), Ti, V, zirconium (Zr), and zinc (Zn), Q is at least one element selected from nitrogen (N), fluorine (F), sulfur (S), and chloride (Cl), $0 \leq x1 \leq 1$, $0 \leq y1 \leq 0.34$, and $0 \leq z1 \leq 1$.

For example, the positive active material may be represented by Formula 3. For example, the positive active material may be LiFePO$_4$.

The positive active material may have an olivine structure. Accordingly, the crystalline structure of the positive active material may be highly stable. Moreover, phosphorous and oxygen may be covalently bonded. Accordingly, oxygen may not be released even at high temperatures, thus promoting chemical stability.

The amount of the positive active material may be about 65 wt % to about 85 wt %, based on the total weight of the positive active material composition. When a positive electrode and a lithium secondary battery including a positive active material composition includes the positive active material within this amount range, the capacity and lifespan characteristics of the positive electrode and the lithium secondary battery may be maintained.

A positive electrode for a lithium secondary battery, according to another aspect, may include a current collector and a positive active material layer formed on the current collector, the positive active material being including or being formed from positive active material composition described above.

In some embodiments, the positive electrode may include a binder layer between the current collector and the positive active material layer.

FIG. 1 illustrates a schematic view of an embodiment of a structure of a positive electrode for a lithium secondary battery.

As shown in FIG. 1, the positive electrode may include a positive electrode current collector 10, a binder layer 20, and a positive active material layer 30, which are sequentially stacked in this stated order. The positive active material layer 30 may include the first conductive agent, identified in FIG. 1 by reference character 301, having a D50 ranging from about 20 nm to about 40 nm and the second conductive agent, identified in FIG. 1 by reference character 302, having a D50 ranging from about 1 μm to about 5 μm.

The binder layer 20 may be between the positive electrode current collector 10 and the positive active material layer 30. The binder layer 20 may solidly bind to the positive electrode current collector 10 and the positive active material layer 30. The binder layer 20 may further improve lithium ion conductivity of the positive active material layer 30.

The packing density of the positive active material layer 30 may be about 2.06 g/cm$^2$ or greater. For example, the packing density of the positive active material layer 30 may be in a range of about 2.09 g/cm$^2$ to about 2.30 g/cm$^2$.

The porosity of the positive active material layer 30 may be about 21 percent by volume (volume %) or less, based on the total volume of the positive active material layer 30. In some embodiments, the porosity of the positive active material layer 30 may be about 16 volume % to about 21 volume %, based on the total volume of the positive active material layer 30.

A lithium secondary battery, according to another aspect, may include the positive electrode described above, a negative electrode including a negative active material, and an electrolyte between the positive electrode and the negative electrode.

The negative electrode may be manufactured as follows.

A negative active material, a conductive agent, a binder, and a solvent may be mixed to prepare a negative electrode slurry composition. The negative electrode slurry composition may be directly coated onto a negative electrode current collector and dried to prepare a negative electrode including a negative active material layer. In some implementations, the negative electrode slurry composition may be cast onto a separate support, which then may be separated from the support and laminated onto the negative electrode current collector to form a negative active material layer thereon, thereby preparing a negative electrode.

As for the negative active material, any suitable negative active material that is used in the art as a negative active material for a lithium secondary battery may be used. In some embodiments, the negative active material may include at least one selected from a lithium metal, a metal alloyable with lithium, a transition metal oxide, a non-transition metal oxide, and a carbonaceous material.

Examples of the metal alloyable with lithium may include Si, Sn, Al, Ge, Pb, Bi, Sb, a Si—Y' alloy (wherein Y' is an alkali metal, an alkaline earth metal, a Group 13 and 14 element, a transition metal, a rare earth element, or combinations thereof except for Si), and a Sn—Y'' alloy (wherein Y" is an alkali metal, an alkaline earth metal, a Group 13 and 14 element, a transition metal, a rare earth element, or combinations thereof except for Sn). Y' or Y" may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may be a lithium titanium oxide, a vanadium oxide, or a lithium vanadium oxide.

For example, the non-transition metal oxide may be $SnO_2$ or $SiO_x$ (wherein 0<x<2).

The carbonaceous material may be crystalline carbon, amorphous carbon, or a combination thereof. The crystalline carbon may be graphite, such as natural graphite or artificial graphite, in non-shaped form, plate, flake, spherical, or fibrous form. The amorphous carbon may be soft carbon (carbon sintered at low temperatures), hard carbon, mesophase pitch carbide, or sintered cork.

A suitable conductive agent available in the art may be used. Examples of the conductive agent may include carbon black, graphite particulates, natural graphite, artificial graphite, acetylene black, Ketjen black, carbon fibers; carbon nanotubes; metallic materials, such as copper, nickel, aluminum, or silver, in powder, fiber, or tube form; and a conductive polymer, such as a polyphenylene derivative.

Either an aqueous binder or a nonaqueous binder may be used as a binder. In some embodiments, the binder may an aqueous binder. The amount of the binder may be in a range of about 0.1 parts by weight to about 5 parts by weight based on 100 parts by weight of the total weight of the negative active material composition. When the amount of the binder is within this range, a binding force of a negative electrode to a negative electrode current collector may be excellent.

Styrene-butadiene-rubber (SBR), polyvinyl alcohol, carboxymethyl cellulose, hydroxypropyl cellulose, diacetyl cellulose, or a mixture thereof may be used as the aqueous binder. The SBR binder may be dispersed in water in emulsion form, such that an organic solvent may not be needed. In addition, a SBR binder generally has a strong binding force. Accordingly, a SBR binder may be used in a lower amount and the negative active material may be used in a greater amount, making it easier to manufacture a lithium secondary battery with high capacity. Such an aqueous binder may be used in conjunction with water or an aqueous solvent or an alcohol solvent capable of being mixed with water. When an aqueous binder is used, a thickener may be used to control the viscosity of the negative active material composition. The thickener may be selected from carboxymethyl cellulose, hydroxymethyl cellulose, hydroxyethyl cellulose, and hydroxypropyl cellulose. The amount of the thickener may be in a range of about 0.8 wt % to about 5 wt %, for example, about 1 wt % to about 5 wt %, for example, about 1 wt % to about 2 wt %, based on the total weight of the negative active material composition.

When the amount of the thickener is within this range, the negative active material layer forming composition may readily be coated on the negative electrode current collector, without a decrease in the capacity of a lithium secondary battery.

The nonaqueous binder may be selected from polyvinyl chloride, polyvinylpyrrolidone, polytetrafluoroethylene, polyvinylidene fluoride (PVdF), polyethylene, polypropylene, and a mixture thereof. The nonaqueous binder may be used in conjunction with a nonaqueous solvent selected from N-methyl-2-pyrrolidone (NMP), dimethyl formamide, tetrahydrofuran, and a mixture thereof.

In some implementations, a plasticizer may be further added to the negative electrode slurry composition to form a negative electrode plate including pores.

The amounts of the negative active material, the conductive agent, the binder, and the solvent may be the same amount as those commonly used in lithium secondary batteries.

The negative electrode current collector may have a thickness of about 3 µm to about 500 µm. The negative electrode current collector may include a suitable material that has a suitable electrical conductivity without causing undesirable chemical changes in the battery. Examples of the negative electrode current collector may include copper, stainless steel, aluminum, nickel, titanium, sintered carbon, copper or stainless steel that is surface-treated with carbon, nickel, titanium or silver, and aluminum-cadmium alloys. In addition, the negative electrode current collector may be processed to have fine irregularities on the surface thereof to enhance a binding force of the negative active material to the negative electrode current collector. the negative electrode current collector may be of a suitable form such as in a form of a film, a sheet, a foil, a net, a porous structure, a foam, or a non-woven fabric.

A positive electrode may be manufactures as follows. A positive electrode of the lithium secondary battery may be manufactured in the same manner as the negative electrode, except for using a positive active material, instead of the negative active material.

As for a positive active material slurry, the foregoing positive active material composition may be used.

A positive active material, a conductive agent, a binder, and a solvent may be mixed together to prepare a positive electrode slurry composition. The positive electrode slurry composition may be directly coated onto a positive electrode current collector and dried to prepare a positive electrode including a positive active material layer. In some implementations, the positive electrode slurry composition may be cast onto a separate support, which then may be separated from the support and laminated onto the positive electrode current collector to form a positive active material layer thereon, thereby preparing a positive electrode.

As for the material for a positive active material, the positive active materials described above may be used. If desired, any suitable material commonly used in the art, such as a lithium-containing metal oxide, may also be used. In some embodiments, a positive active material may include at least one composite oxide of a metal selected from cobalt, manganese, nickel, and a combination thereof, and lithium. Examples of the material for a positive active material may include at least one compound selected from $Li_aA_{1-b}B'_bD'_2$ (wherein $0.90 \leq a \leq 1$ and $0 \leq b \leq 0.5$); $Li_aE_{1-b}B'_bO_{2-c}D'_c$ (wherein $0.90 \leq a \leq 1$, $0 \leq b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1$, $0 \leq b \leq 0.5$, $0 \leq c \leq 0.05$, and $0 \leq \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$);

$Li_aNi_{1-b-c}Mn_bB'_cD'_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_b B'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiPO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

The compounds listed above as positive active materials may have a surface coating layer (hereinafter, "coating layer"). In some implementations, a mixture of a compound not having a coating layer and a compound having a coating layer, the compounds being selected from the compounds listed above, may be used. The coating layer may include at least one compound of a coating element selected from an oxide, a hydroxide, an oxyhydroxide, an oxycarbonate, and a hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed by using a suitable method that does not adversely affect the physical properties of the positive active material when a compound of the coating element is used. For example, the coating layer may be formed by using a spray coating method, or a dipping method.

The amounts of the positive active material, the conductive agent, the binder, and the solvent may be the same amount as those commonly used in lithium secondary batteries. At least one of the conductive agent, the binder, and the solvent may be omitted depending on the use and the structure of the lithium secondary battery.

The positive electrode current collector may have a thickness of about 3 µm to about 500 µm. The positive electrode current collector may be a suitable material that has a suitable electrical conductivity without causing undesirable chemical changes in the battery. Examples of the negative electrode current collector may include copper, stainless steel, aluminum, nickel, titanium, sintered carbon, copper or stainless steel that is surface-treated with carbon, nickel, titanium or silver, and aluminum-cadmium alloys. In addition, the positive electrode current collector may be processed to have fine irregularities on the surface thereof to enhance a binding force of the positive active material to the positive electrode current collector. The positive electrode current collector may be in a suitable form such as in a form of a film, a sheet, a foil, a net, a porous structure, a foam, and a non-woven fabric.

The mixture density of the positive electrode may be 2.0 g/cc or greater.

In some embodiments, the positive electrode and the negative electrode may be separated from each other by a separator. A suitable separator that is generally available in the art of lithium secondary batteries may be used. For example, a separator that has low resistance to migration of ions of an electrolyte and excellent electrolytic solution-retaining ability may be used. Examples of the separator may include glass fiber, polyester, Teflon™, polyethylene, polypropylene, polytetrafluoroethylene (PTFE), and a combination thereof, each of which may be in a form of a nonwoven fabric or a woven fabric. The pore diameter of separator may be about 0.01 µm to about 10 µm and a thickness thereof may be about 5 µm to about 300 µm.

An electrolyte disposed between the positive electrode and the negative electrode may be a solid electrolyte. The solid electrolyte may be an organic solid electrolyte, an inorganic solid electrolyte, or a combination thereof.

Examples of the inorganic solid electrolyte may include a Li nitride, e.g., $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$, a halide, and a sulfate.

Examples of the organic solid electrolyte may include at least one selected from polyurethane doped with lithium, a polyethylene derivative, a polyethylene oxide derivative, a polypropylene oxide derivative, a phosphoric acid ester polymer, a poly agitation lysine, a polyester sulfide, a polyvinyl alcohol, a polyvinylidene difluoride, and a polymer including an ionic dissociable group.

For example, the solid electrolyte may be the foregoing organic solid electrolyte. For example, the solid electrolyte may be polyurethane doped with lithium.

The lithium secondary battery may be an all-solid lithium ion secondary battery. The lithium secondary battery may be a cylindrical type, a rectangular type, a coin type, or a pouch type according to the shape thereof. The lithium secondary battery may also be classified as either bulk type or thin film type according to the size thereof. The lithium secondary battery may be, for example, a pouch-type lithium secondary battery.

Figure 2:
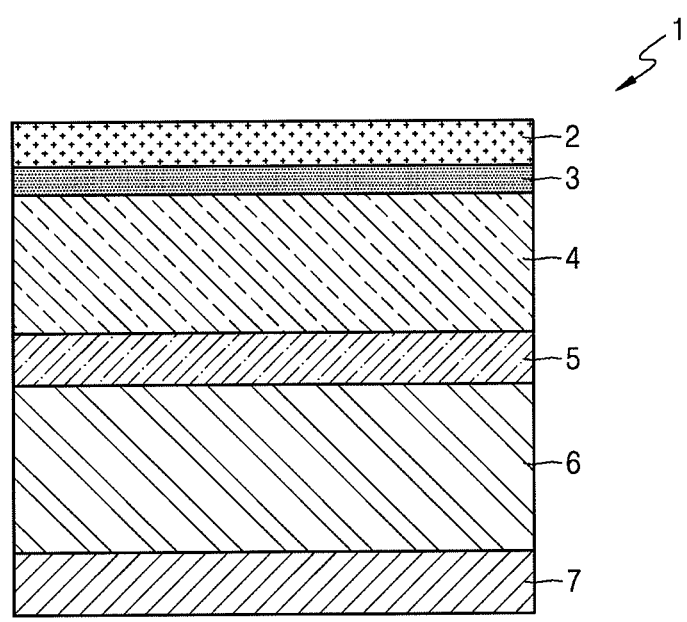
FIG. 2 illustrates a schematic view of an embodiment of a structure of a lithium secondary battery.

FIG. 2 illustrates a schematic view of an embodiment of a structure of a lithium secondary battery 1.

As shown in FIG. 2, the lithium secondary battery (all-solid lithium secondary battery) 1 may include a positive electrode including a positive electrode current collector 2, a binder layer 3, and a positive active material layer 4, a negative electrode in which a negative active material layer 6 is stacked on a negative electrode current collector 7, and a solid electrolyte 5 between the positive electrode and the negative electrode. The positive electrode, the negative electrode, and the solid electrolyte 5 may be pressed, accommodated in a pouch, and then sealed to manufacture the lithium secondary battery 1. For example, the lithium secondary battery 1 may be a large thin-film type battery.

In some implementations, a plurality of battery assemblies may be stacked upon one another to form a battery pack, which may be used in any device that requires large capacity and high power. For example, the battery pack may be used in a laptop computer, a smart phone, a power tool, or an electric vehicle.

In addition, the lithium secondary battery 1 may be used in an electric vehicle (EV). For example, the lithium secondary battery 1 may be used in a hybrid vehicle, such as a plug-in hybrid electric vehicle (PHEV).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Preparation of Positive Active Material Composition

Example 1: Preparation of Positive Active Material Composition 75 wt % of a LiFePO$_4$ positive active material, 10 wt % of a conductive agent including Ketjen black powder (D50 of about 35 nm) mixed with SP 270 powder (D50 of about 2 μm) at a weight ratio of about 1:1, and a binder, which included 15 wt % of polyethylene carbonate represented by Formula 1-1 mixed with lithium bis(trifluoromethane)sulfonimide (LiTFSI) such that a molar ratio of polyethylene carbonate to lithium ions was 8:1, were mixed together to prepare a positive active material composition.

Formula 1-1

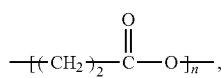

wherein, in Formula 1-1, n is in a range of about 500 to about 2,000.

Example 2: Preparation of Positive Active Material Composition

A positive active material composition was prepared in the same manner as in Example 1, except that 10 wt % of a conductive agent including Super P powder (D50 of about 32 nm) mixed with SP 270 powder (D50 of about 2 μm) at a weight ratio of about 1:1 was used, instead of 10 wt % of the conductive agent including Ketjen black powder (D50 of about 35 nm) mixed with SP 270 powder (D50 of about 2 μm) at a weight ratio of about 1:1.

Example 3: Preparation of Positive Active Material Composition

A positive active material composition was prepared in the same manner as in Example 1, except that 10 wt % of a conductive agent including Denka black powder (D50 of about 30 nm) mixed with SP 270 powder (D50 of about 2 μm) at a weight ratio of about 1:1 was used, instead of 10 wt % of the conductive agent including Ketjen black powder (D50 of about 35 nm) mixed with SP 270 powder (D50 of about 2 μm) at a weight ratio of about 1:1.

Example 4: Preparation of Positive Active Material Composition

A positive active material composition was prepared in the same manner as in Example 1, except that 10 wt % of a conductive agent including Denka black powder (D50 of about 30 nm) mixed with SP 270 powder (D50 of about 3.5 μm) at a weight ratio of about 1:1 was used, instead of 10 wt % of the conductive agent including Ketjen black powder (D50 of about 35 nm) mixed with SP 270 powder (D50 of about 2 μm) at a weight ratio of about 1:1.

Comparative Example 1: Preparation of Positive Active Material Composition

A positive active material composition was prepared in the same manner as in Example 1, except that 10 wt % of a conductive agent including Denka black powder (D50 of about 30 nm) was used, instead of 10 wt % of the conductive agent including Ketjen black powder (D50 of about 35 nm) mixed with SP 270 powder (D50 of about 2 μm) at a weight ratio of about 1:1.

Comparative Example 2: Preparation of Positive Active Material Composition

A positive active material composition was prepared in the same manner as in Example 1, except that 10 wt % of a conductive agent including Ketjen black powder (D50 of about 35 nm) was used, instead of 10 wt % of the conductive agent including Ketjen black powder (D50 of about 35 nm) mixed with SP 270 powder (D50 of about 2 μm) at a weight ratio of about 1:1.

Comparative Example 3: Preparation of Positive Active Material Composition

A positive active material composition was prepared in the same manner as in Example 1, except that Lamp black powder (D50 of about 95 nm) was used, instead of 10 wt % of the conductive agent including Ketjen black powder (D50 of about 35 nm) mixed with SP 270 powder (D50 of about 2 μm) at a weight ratio of about 1:1.

Comparative Example 4: Preparation of Positive Active Material Composition

A positive active material composition was prepared in the same manner as in Example 1, except that SP 270 powder (D50 of about 2 μm) was used, instead of 10 wt % of the conductive agent including Ketjen black powder (D50 of about 35 nm) mixed with SP 270 powder (D50 of about 2 μm) at a weight ratio of about 1:1.

Comparative Example 5: Preparation of Positive Active Material Composition

A positive active material composition was prepared in the same manner as in Example 1, except that 10 wt % of a conductive agent including Denka black powder (D50 of about 30 nm) mixed with Lamp black powder (D50 of about 95 nm) at a weight ratio of about 1:1 was used, instead of 10 wt % of the conductive agent including Ketjen black powder (D50 of about 35 nm) mixed with SP 270 powder (D50 of about 2 μm) at a weight ratio of about 1:1.

Comparative Example 6: Preparation of Positive Active Material Composition

A positive active material composition was prepared in the same manner as in Example 1, except that 10 wt % of a conductive agent including Denka black powder (D50 of about 30 nm) mixed with natural graphite powder (D50 of about 10.5 μm) at a weight ratio of about 1:1 was used, instead of 10 wt % of the conductive agent including Ketjen black powder (D50 of about 35 nm) mixed with SP 270 powder (D50 of about 2 μm) at a weight ratio of about 1:1.

Manufacture of Lithium Secondary Battery (Pouch Full-Cell)

Example 5: Manufacture of Lithium Secondary Battery (Pouch Full-Cell)

The positive active material composition prepared in Example 1 was coated on an aluminum foil (thickness of about 15 μm) by using a blade to form a positive active material layer (thickness of about 50 μm), dried at a temperature of 25° C., and then the resultant was further dried under vacuum at a temperature of about 80° C. to manufacture a positive electrode.

Lithium metal (thickness of about 20 μm), as a negative active material, was stacked on a copper foil (thickness of about 10 μm) to manufacture a negative electrode.

Polyurethane doped with lithium, as a solid electrolyte, (weight-average molecular weight (Mw) of about 120,000) and the positive electrode were sequentially stacked on the negative electrode in this stated order, and then the negative electrode, the solid electrolyte, and the positive electrode were pressed to manufacture a lithium secondary battery (a pouch full-cell).

Examples 6 to 8: Manufacture of Lithium Secondary Battery (Pouch Full-Cell)

Lithium secondary batteries (pouch full-cells) were manufactured in the same manner as in Example 5, except that the positive active material compositions prepared in Examples 2 to 4 were used, instead of the positive active material composition prepared in Example 1, respectively.

Comparative Examples 7 to 12: Manufacture of Lithium Secondary Battery (Pouch Full-Cell)

Lithium secondary batteries (pouch full-cells) were manufactured in the same manner as in Example 5, except that the positive active material compositions prepared in Comparative Examples 1 to 6 were used, instead of the positive active material composition prepared in Example 1, respectively.

Evaluation of Positive Active Material Layer and Battery Performance

Evaluation Example 1: Average Particle Diameter (D50) Distribution

The D50 distribution of the conductive agent powder in the positive active material composition prepared in Example 3 was measured. The results thereof are shown in FIG. 3.

About 0.1 g of the conductive agent powder in the positive active material composition of Example 3 was added to 20 ml of a vial bottle, which was then filled with distilled water. The D50 distribution of the conductive agent powder was measured by using a LS 13 320 model available from Hitachi Co., Ltd. Before measuring the D50 distribution, the conductive agent powder and distilled water in the vial bottle were dispersed for about 1 minute by using an ultrasonic disperser.

Figure 3:
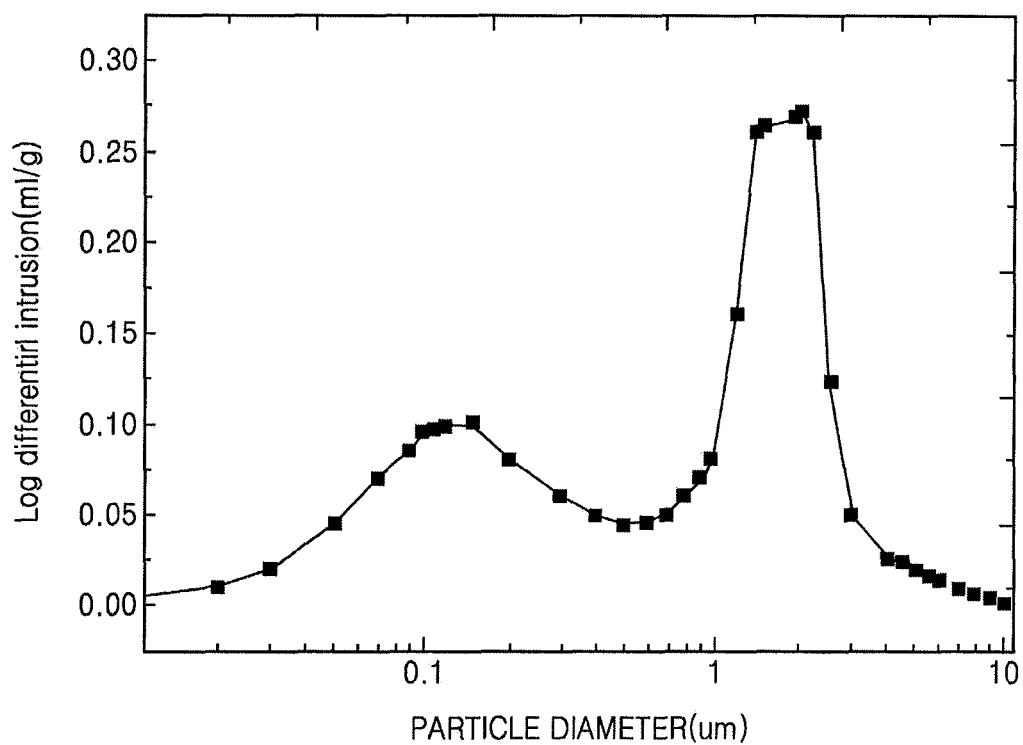
FIG. 3 illustrates a graph illustrating average particle diameter (D50) distribution of conductive agent powder included in a positive active material composition prepared in Example 3.

As shown in FIG. 3, the D50 of the conductive agent powder in the positive active material composition of Example 3 was about 30 nm and about 2 μm. However, it was difficult to detect the D50 at about 100 nm or less due to a resolution problem. At about 1 μm or less, the D50 distribution was slightly broad due to agglomeration.

Evaluation Example 2: Packing Density and Porosity

The packing density and the porosity of the positive active material layers of the lithium secondary batteries (pouch full-cells) manufactured in Examples 5 to 8 and Comparative Examples 7 to 12 were evaluated. The results thereof are shown in Table 1.

The positive electrodes of the lithium secondary batteries (pouch full-cells) of Examples 5 to 8 and Comparative Examples 7 to 12 were each pressed under a pressure of about 1,000 pascals (Pa) for 5 minutes, and the thickness of each positive electrode including or not including the positive active material layer were measured to calculate the thickness of each positive active material layer so as to calculate the packing density and the porosity thereof by using Equations 1 and 2. In Equations 1 and 2, the "actual density" refers to a density calculated by dividing a weight of the positive active material by a thickness of the positive active material layer on an area coated with the positive active material layer, and the "true density" refers to a theoretical density of the positive active material layer without pores.

Packing density(g/cm$^2$)=[actual density/true density]     Equation 1

Porosity (%)=[{1−(actual density/true density)}×100]     Equation 2

TABLE 1

| Classification | Packing density (g/cm$^2$) | Porosity (%) |
|---|---|---|
| Example 5 | 2.16 | 16 |
| Example 6 | 2.11 | 19 |
| Example 7 | 2.22 | 14 |
| Example 8 | 2.30 | 13 |
| Comparative Example 7 | 2.04 | 25 |
| Comparative Example 8 | 2.03 | 26 |
| Comparative Example 9 | 2.05 | 25 |
| Comparative Example 10 | 2.05 | 23 |
| Comparative Example 11 | 2.09 | 21 |
| Comparative Example 12 | 2.09 | 20 |

As shown in Table 1, the packing density of the positive active material layers of the lithium secondary batteries (pouch full-cells) of Examples 5 to 8 were all 2.10 g/cm$^2$ or greater, which was improved, as compared with the packing density of the positive active material layers of the lithium secondary batteries (pouch full-cells) of Comparative Examples 7 to 12.

The porosity of the positive active material layers of the lithium secondary batteries (pouch full-cells) of Examples 5 to 8 were all 19 volume % or less, based on the total volume of the positive active material layer, which was reduced, as compared with those of the positive active material layers of the lithium secondary batteries (pouch full-cells) of Comparative Examples 7 to 12.

Evaluation Example 3: Current Density and Energy Density Evaluation

The current density and energy density of the lithium secondary batteries (pouch full-cells) of Examples 5 to 8 and Comparative Examples 7 to 12 were evaluated. The results thereof are shown in Table 2.

The current density (mAh/cm$^2$) was calculated by dividing the total current passing through the batteries by the geometrical area of the electrodes of the batteries. The energy density was calculated by using Equation 3.

Energy density(Wh/L)=[(current density of positive electrode/total thickness of cell)×average voltage]     Equation 3

TABLE 2

| Classification | Current density (mAh/cm$^2$) | Energy density (Wh/L) |
| --- | --- | --- |
| Example 5 | 1.73 | 365 |
| Example 6 | 1.70 | 347 |
| Example 7 | 1.76 | 380 |
| Example 8 | 1.78 | 385 |
| Comparative Example 7 | 1.64 | 310 |
| Comparative Example 8 | 1.63 | 309 |
| Comparative Example 9 | 1.64 | 314 |
| Comparative Example 10 | 1.65 | 319 |
| Comparative Example 11 | 1.68 | 321 |
| Comparative Example 12 | 1.68 | 322 |

As shown in Table 2, the current density and the energy density of the lithium secondary batteries (pouch full-cells) of Examples 5 to 8 were excellent, as compared with those of the lithium secondary batteries (pouch full-cells) of Comparative Examples 7 to 12.

By way of summation and review, it may be difficult to control the porosity and packing density of a positive active material layer by using a general structure and/or general type of a conductive agent. The structure and/or type of such a conductive agent may be changed so as to increase the packing density and decrease the porosity of a positive active material layer.

In general, it is difficult to press a positive active material layer that includes a positive active material composition including single modal such as single size and single type conductive agent to a certain or greater degree of porosity. A packing density per unit area of such a positive active material layer is also limited.

A positive active material composition for a lithium secondary battery, according to one or more embodiments, may include a conductive agent in a bimodal form, readily forming an agglomerated structure. The packing density of the formed positive active material layer may be increased and the porosity of the formed positive active material layer may be decreased. When a positive electrode and a lithium secondary battery include the positive active material layer including the positive active material composition, the current density and/or energy density of the positive electrode and the lithium secondary battery may be improved.

As described above, a positive electrode and a lithium secondary battery include a positive active material layer that includes a positive active material composition according to one or more embodiments may have improved energy density (or current density).

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A positive active material composition for a lithium secondary battery, the composition comprising:
a positive active material;
a binder, wherein the binder is an ion conductive polymer binder further including a lithium salt, wherein a molar ratio of repeating units to lithium ions in the binder is in a range of about 8:1 to about 1:1; and
a conductive agent,
wherein the conductive agent includes:
a first conductive agent having an average particle diameter (D50) ranging from about 20 nanometers (nm) to about 40 nm; and
a second conductive agent having a D50 ranging from about 1 micrometer (μm) to about 5 μm.

2. The positive active material composition as claimed in claim 1, wherein the first conductive agent and the second conductive agent include a carbon material.

3. The positive active material composition as claimed in claim 2, wherein the carbon material includes at least one selected from carbon black, graphite powder, natural graphite, artificial graphite, and acetylene black.

4. The positive active material composition as claimed in claim 1, wherein the first conductive agent includes carbon black, and the second conductive agent includes graphite powder.

5. The positive active material composition as claimed in claim 1, wherein the first conductive agent has a D50 ranging from about 30 nm to about 35 nm.

6. The positive active material composition as claimed in claim 1, wherein an amount of the conductive agent is about 3 percent by weight (wt %) to about 15 wt %, based on the total weight of the positive active material composition.

7. The positive active material composition as claimed in claim 1, wherein the binder includes a binder represented by Formula 1:

Formula 1 wherein, in Formula 1, n is an integer selected from 500 to 50,000.

8. The positive active material composition as claimed in claim 1, wherein the lithium salt includes at least one selected from lithium bis(trifluoromethane)sulfonimide (LiTFSI), lithium bis(fluorosulfonyl) imide (LiFSI), LiClO$_4$, LiBF$_4$, and LiPF$_6$.

9. The positive active material composition as claimed in claim 1, wherein an amount of the binder is about 10 wt % to about 35 wt %, based on the total weight of the positive active material composition.

10. The positive active material composition as claimed in claim 1, wherein the positive active material includes at least one selected from positive active materials represented by Formulae 2 to 4:

     Formula 2 wherein, in Formula 2,
M' is at least one element selected from cobalt (Co), manganese (Mn), iron (Fe), vanadium (V), copper (Cu), chromium (Cr), aluminum (Al), magnesium (Mg), and titanium (Ti), 0.9≤a≤1.1, 0≤x≤0.6, 0.4≤y≤1, and x+y=1,

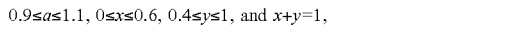     Formula 3 wherein, in Formula 3,

M is at least one element selected from Fe, Mn, nickel (Ni), Co, and V, $$Li_{1+y1}Mn_{2-y1-z1}M''_{z1}O_{4-x1}Q_{x1} \quad \text{Formula 4}$$

wherein, in Formula 4,

M" is at least one element selected from Mg, Al, Ni, Co, Fe, Cr, Cu, boron (B), calcium (Ca), niobium (Nb), molybdenum (Mo), strontium (Sr), antimony (Sb), tungsten (W), Ti, V, zirconium (Zr), and zinc (Zn), Q is at least one element selected from nitrogen (N), fluorine (F), sulfur (S), and chlorine (Cl), $0 \leq x1 \leq 1$, $0 \leq y1 \leq 0.34$, and $0 \leq z1 \leq 1$.

11. The positive active material composition as claimed in claim 1, wherein an amount of the positive active material is about 65 wt % to about 85 wt %, based on the total weight of the positive active material composition.

12. A positive electrode for a lithium secondary battery, the positive electrode comprising:
a current collector; and
a positive active material layer formed on the current collector, the positive active material layer including the positive active material composition as claimed in claim 1.

13. The positive electrode as claimed in claim 12, wherein a packing density of the positive active material layer is about 2.06 g/cm² or greater.

14. The positive electrode as claimed in claim 12, wherein a porosity of the positive active material layer is about 21 percent by volume (volume %) or less, based on a total volume of the positive active material layer.

15. A lithium secondary battery, comprising:
the positive electrode as claimed in claim 12;
a negative electrode including a negative active material; and
an electrolyte between the positive electrode and the negative electrode.

16. The lithium secondary battery as claimed in claim 15, wherein the electrolyte is or includes a solid electrolyte.

17. The lithium secondary battery as claimed in claim 15, wherein the solid electrolyte includes at least one selected from polyurethane doped with lithium, a polyethylene derivative, a polyethylene oxide derivative, a polypropylene oxide derivative, a phosphoric acid ester polymer, a poly agitation lysine, a polyester sulfide, a polyvinyl alcohol, a polyvinylidene difluoride, and a polymer including an ionic dissociable group.

* * * * *